Sept. 5, 1944. S. E. HEYMANN 2,357,403
HEATING SYSTEM
Filed Dec. 12, 1941 2 Sheets-Sheet 1
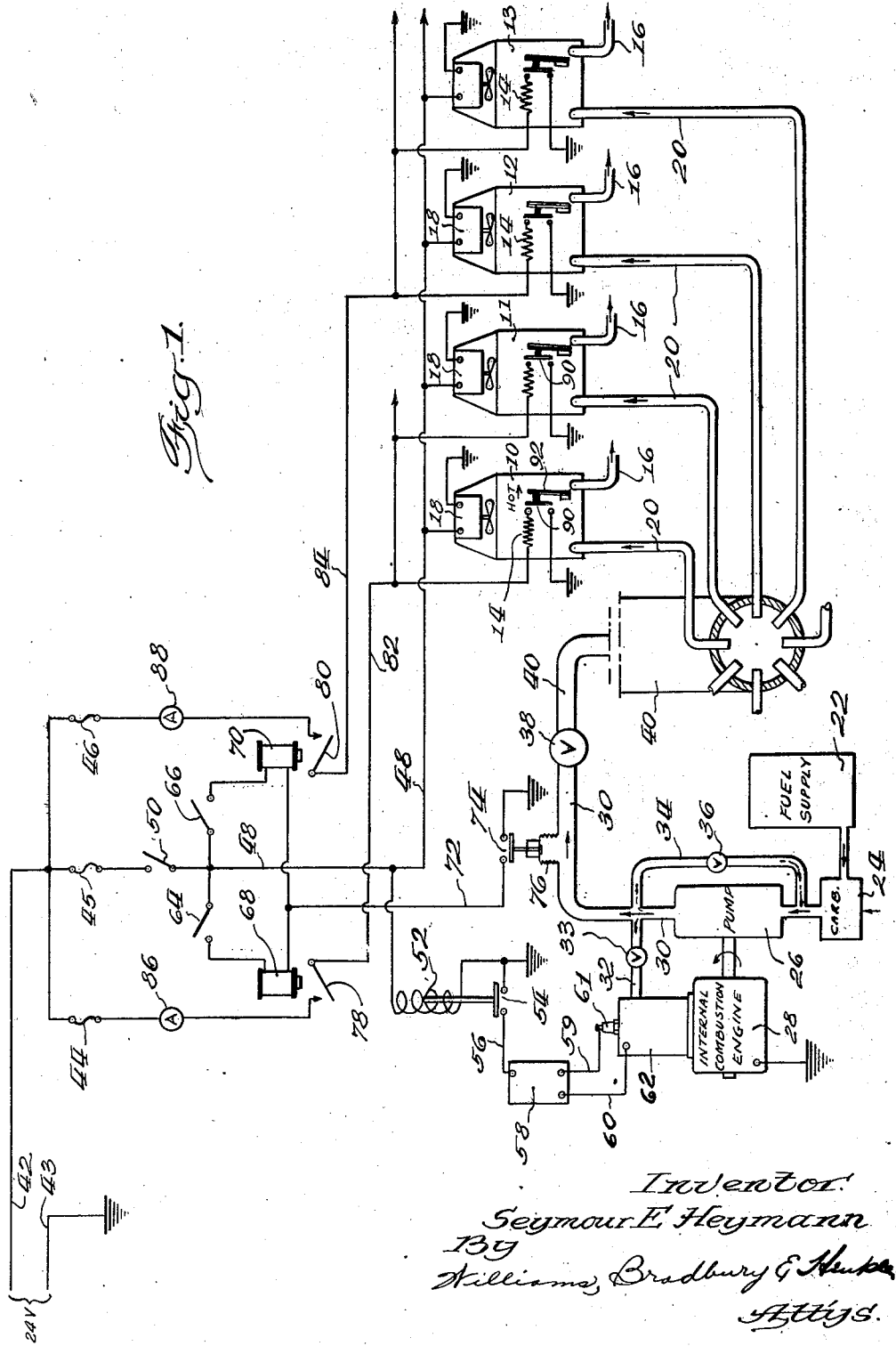
Inventor:
Seymour E. Heymann
By
Williams, Bradbury & Henkel
Attys.

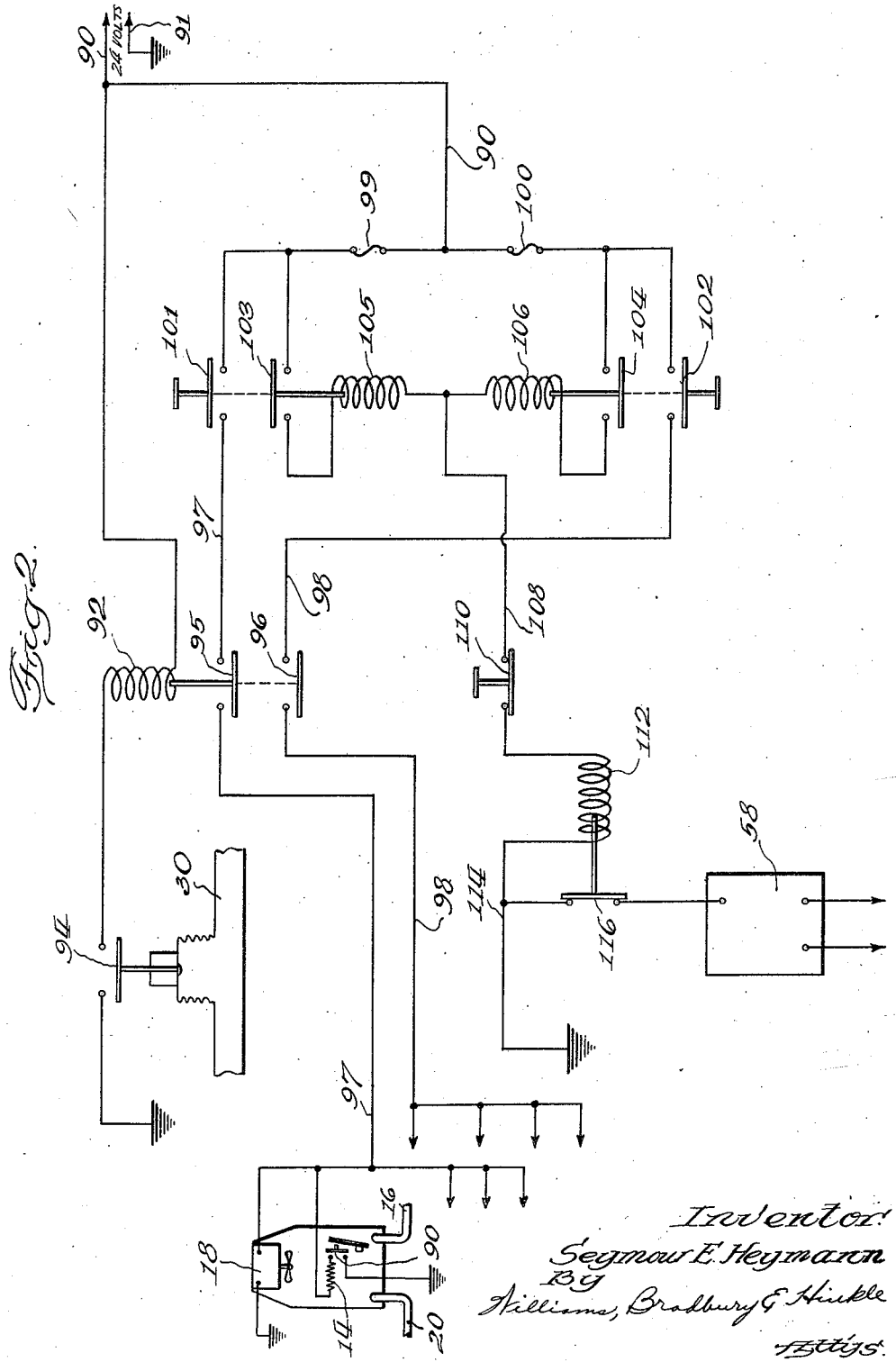

Patented Sept. 5, 1944

2,357,403

UNITED STATES PATENT OFFICE 2,357,403

HEATING SYSTEM

Seymour E. Heymann, Hollywood, Calif., assignor to Stewart-Warner Corporation, Chicago, Ill., a corporation of Virginia Application December 12, 1941, Serial No. 422,724

8 Claims. (Cl. 237—2)

My invention relates generally to heating systems, and more particularly to controls for aircraft heating systems.

In heating systems for aircraft, particularly military airplanes, it is of great importance that the controls be designed for utmost safety in operation, and that the system be very flexible in operation to suit the widely varying operating conditions. It is thus an object of my invention to provide an improved control apparatus for aircraft heating systems employing internal combustion type heater units.

A further object is to provide an improved heating system for aircraft employing electrically ignited internal combustion heater units, in which the load upon the electrical generating system of the aircraft is reduced when starting the units.

A further object is to provide an improved control apparatus for aircraft heating systems in which means are provided to prevent operation of the heater units until the air circulating fans of the heaters have been energized.

A further object is to provide an improved control apparatus for aircraft heating systems employing internal combustion type heater units with electrical igniters, in which means are provided to prevent energization of the igniters until after a flow of combustible mixture to the heater units has been started.

Other objects will appear from the following description, reference being had to the accompanying drawings, in which:

Fig. 1 is a diagrammatic representation of representative portions of an aircraft heating system, showing particularly the control circuits therefor; and Fig. 2 is a diagram of a modified form of the invention.

Referring to Fig. 1, the aircraft heating system comprises a plurality of heater units 10, 11, 12, and 13, of which units 10 and 11 are representative of a group of four heater units, while heaters 12 and 13 are representative of an additional group of four heater units. Each of these units may consist of a combustion chamber having an electrically operated resistance wire igniter 14 associated therewith for the ignition of fuel, and a suitable heat exchanger through which the products of combustion from the combustion chamber are drawn, the products of combustion being discharged through exhaust pipes 16 which may project through the fuselage wall of the airplane, preferably at a point at which there is a partial vacuum when the aircraft is in flight.

Each of the heater units includes a fan motor 18 for circulating air to be heated over the heat exchanger. The heater units may be located in various compartments of the airplane where a local supply of heat is required, the fuel mixture for these units being conveyed thereto through conduits 20.

The fuel, such as gasoline, is supplied from a suitable tank 22 to a carburetor 24, the fuel mixture being drawn from the carburetor 24 by a positive displacement pump 26 which may be a Roots blower driven by an internal combustion engine 28. The fuel supply for the engine 28 may be drawn from the outlet conduit 30 of the pump 26 through conduit 32, the flow being controlled by a valve 33. A by-pass conduit 34 connects the outlet with the inlet of the pump 26, the flow through the by-pass being controlled by a valve 36.

The rate of flow of combustible mixture through the outlet conduit 30 of the pump to the heater units may likewise be controlled by a valve 38, although in many installations the valve 38 may be omitted, and the rate at which the combustible mixture is supplied to the heating units by the pump 26 controlled solely by adjustment of the valve 33 in the conduit 32 and the valve 36 in the by-pass 34. The conduit 30 terminates in a header 40, portions of which are shown to different scales. The inlet conduits 30 for the individual heater units project into the header 40 so as to receive a uniform combustible mixture therefrom, as is more fully described and claimed in the co-pending application of Henry J. DeN. McCollum, Serial No. 410,038, filed September 8, 1941.

The electrical controls for the heating system comprise conductors 42, 43, connected to a suitable source of electrical energy, the conductor 43 being illustrated as connected to ground, while the conductor 42 is connected to fuses 44, 45, and 46 in parallel. The fuses 44 and 46 are each of sufficiently high amperage rating to carry the current necessary for the energization of the electrical igniters 14 of one group of heater units, while the fuse 45 may be of considerably lower amperage rating, but amply sufficient to carry energizing current for the fan motors 18 of all of the heater units of the system.

Each of the fan motors 18 has one terminal thereof illustrated as grounded, while the other terminal thereof is connected to the conductor 48 which is adapted to be connected to the main conductor 42 through the fuse 45 upon closure of a manually operated switch 50. A relay winding 52 is connected in parallel with the heater motors 18, and when energized, is adapted to open a switch 54. The switch 54 is shown as connected in a conductor 56, by which the ignition system for the internal combustion engine is rendered inoperative by being connected to ground, the ignition system being illustrated schematically as a block 58 having conductors 59 and 60 connected to a spark plug 61 and a cylinder 62, respectively, of the engine 28. The switch 54, instead of breaking a circuit upon energization of the relay winding 52, might as well be constructed to complete the circuit through the conductor 59 to the spark plug 61 upon energization of the relay 52, it being merely essential that the energization of the relay 52 shall render operative the ignition system of the engine 28.

From the foregoing, it will be seen that upon closure of the switch 50 the fan motors 18 will be energized and the engine 28 conditioned for starting.

A pair of switches 64, 66, is connected in series with relay windings 68, 70, respectively, the other ends of these windings being connected to a conductor 72 which is adapted to be connected to ground upon the closure of a switch 74. The switch 74 is operated by pressure within the conduit 30, being illustrated as having its movable contactor carried by the movable part of an expansible bellows 76, which is attached to the conduit 30 and communicates therewith.

The relay windings 68 and 70 are adapted, upon energization, to close switches 78 and 80, thereby to complete circuits from the fuses 44 and 46 to conductors 82 and 84, respectively. Ammeters 86, 88, may be connected adjacent the fuses 44 and 46 to indicate the current drawn upon closure of the switches 78 and 80. The conductor 82 is connected to parallel electrical resistance igniters 14 of one group of heater units, such as the group represented by the units 10 and 11, while the conductor 84 is similarly connected to the electrical igniters 14 of a second group of heater units represented by the units 12 and 13. The other terminal of each of the igniters 14 is normally connected to ground by a switch 90, which is operated by, but insulated from, a bimetal thermostatic element 92, which is responsive to the heat of combustion of the respective combustion chambers. The switches 90 are preferably of the snap action microswitch type.

When it is desired to cause operation of the system, the operator will first close switch 50, which will result in energizing all of the fan motors 18, and in rendering operative the ignition system 58 of the internal combustion engine 28. The engine 28 will then be started, whereupon, the combustible mixture will be forced under pressure through the conduit 30 to the header 40, and distributed through the conduits 20 to the individual heater units 10, 13, etc. As soon as pressure is built up within the conduit 30, the switch 74 will close, thus connecting the conductor 72 to ground. Thereafter, the operator will close the switch 64, resulting in the energization of its relay winding 68 and closure of the switch 78, whereupon, the igniters 14 for one group of heaters will be energized.

The igniters will be heated to incandescence and ignite the combustible mixture supplied through their associated conduits 20, and ignite the mixture. Shortly after such ignition takes place, the bimetal thermostatic elements 92 will operate to open the switches 90. When all of these switches have been opened, current will cease to flow through the circuit controlled by the switch 78, and such fact will be indicated by the ammeter 86. The operator may then close switch 66 to energize relay winding 70, causing the latter to close the switch 80 and supply current to the igniters 14 which are connected to the conductor 84. Thus, the second group of heaters will be ignited, and will continue to burn the fuel supplied to the units by their conduits 20.

By thus dividing the heater units into groups, the peak current consumption from the supply conductors 42, 43, may be reduced by substantially one-half, assuming that there are but two groups of heaters. In installations for larger aircraft, where a larger number of heater units is required, such units may be divided into three or more groups, so that the electrical load incident to the energization of the igniters will not constitute an excessive drain upon the electrical generating system of the aircraft.

In Fig. 2 is illustrated a modified form of the invention which is in some respects simpler than that shown in Fig. 1, but does not possess the advantage of the control system of Fig. 1, namely, that the fan motors are energized prior to and independently of the operation of the heating units, which may be of importance in some installations.

In this system, current is supplied through conductors 90 and 91, the latter being shown as connected to ground. A relay winding 92 is connected in series with a switch 94, which corresponds to the switch 74 of Fig. 1, and is closed as soon as an operating pressure is built up within the conduit 30.

The relay winding 92, upon energization, closes switches 95 and 96 connected in the heater energizing circuits, which comprise conductors 97 and 98 connected, respectively, to groups of four heater units in parallel, only one unit being illustrated. It will be noted that the conductor 97 supplies current to the fan motor 18 directly and to the igniter 14 of this heater unit only when the thermostatic switch 90 thereof is closed.

A pair of fuses 99 and 100 are connected to the main supply conductor 90, the fuse 99 being in series with a pair of push button switches 101 and 103, while the fuse 100 is similarly connected to switches 102 and 104. The push button switches 101, 103 are adapted to be held in closed position by a holding electromagnet 105, while the push button switches 102 and 104 are adapted to be held in closed position by a holding electromagnet 106. The holding circuit for the electromagnet 105 includes the conductor 90, fuse 99, switch 103, conductor 108, a normally closed push button "off" switch 110, a relay winding 112, and a conductor 114 connected to ground. The holding circuit for the push button switches 102 and 104 similarly includes the conductor 90, fuse 100, switch 104, electromagnet winding 106, conductor 108, "off" switch 110, winding 112, and conductor 114 to ground. Upon energization of the winding 112, a normally closed switch 116 is opened to render operative the ignition means 58 for the internal combustion engine, the arrangement being similar to that shown in Fig. 1.

Assuming that the conductors 90 and 91 are connected to a suitable source of electrical energy, the operator will manually operate the push button to close switches 101 and 103, such closure resulting in establishing the holding circuit for these switches by energizing the winding of the electromagnet 105, and also rendering the ignition means 58 operative by opening the switch 116. The operator may then start the internal combustion engine to cause operation of the fuel mixture supply system for the heater units. Such operation will result in building up the pressure in the conduit 30 and thus close switch 94. Closure of the switch 94 will complete the circuit through the relay winding 92 and thereby close switches 95 and 96. Closure of the switch 95 will result in current flow through the conductor 97 to the connected group of heater units, causing energization of their fan motors and igniters. After ignition has taken place and normal combustion in these heater units has been established, the thermostatically operated switches 90 thereof will open.

After a suitable interval, sufficient to cause establishment of combustion in the first group of heater units, the operator may operate the push button to close switches 102 and 104, thus establishing a circuit through the holding coil 106. Since switch 96 will have been previously closed, closure of the switch 102 will complete the circuit through the conductor 98, to energize the second group of heater units. Whenever it is desired to stop the operation of the heating system, it is necessary merely for the operator to open push button switch 110, thus deenergizing the holding coils 105, 106, and 112, whereupon, the push button switches 101, 103, and 102, 104, will be opened to cut off the supply of current to the heater units, and switch 116 will close to stop operation of the internal combustion engine by grounding the latter.

From the foregoing, it will be clear that the maximum drain upon the source of electrical energy of the aircraft is approximately half of what it would be if all of the igniters of the heater units were simultaneously energized. Furthermore, it is not possible to energize the heater units until the internal combustion engine is operating to supply the combustible mixture to the units and the system may be completely deenergized, and its operation stopped, merely by pressing a single push button "off" switch 110.

While I have shown and described preferred embodiments of my invention, it will be apparent to those skilled in the art that numerous variations and modifications in various details of construction may be made without departing from the more fundamental principles of my invention. I therefore desire, by the following claims, to include within the scope of my invention, all such variations and modifications by which substantially the results of my invention may be obtained through the use of substantially the same or equivalent means.

I claim:

1. Electrical control apparatus for a heating system having a plurality of groups of heating units each requiring a relatively high amperage current during its starting period, and having means for supplying fuel thereto, the combination of a manually completed circuit for conditioning said fuel supply means for operation, a manually controlled second circuit for supplying energizing current to one group of said heating units, a manually controlled third circuit for supplying energizing current to another group of said heating units, and means responsive to failure of effective operation of said fuel supply means to prevent completion of said second and third circuits.

2. Electrical control apparatus for an aircraft heating system which incorporates a plurality of groups of internal combustion type heating units each unit having an electrically operated igniter, and a means common to the groups of units for supplying fuel thereto, comprising, a plurality of conductors each connected to supply electrical energy to one of said groups of heaters, relay operated switches for connecting said conductors to a source of energy, energizing circuits for said relays, a manually operable switch in each of said energizing circuits, and switch means common to both of said energizing circuits operated in response to operation of said fuel supply means to condition said energizing circuits for completion by their respective manually operable switches.

3. In combination, a plurality of groups of internal combustion type heating units having electrically energized igniters drawing substantial amounts of current, a pump to supply a fuel mixture to said units, power means connected to drive said pump, a manually completed first circuit for conditioning said power means for operation, a second circuit for energizing the igniters of one of said groups of heating units, a third circuit for energizing the igniters of another of said groups of heating units, and a switch responsive to failure of operation of said pump to render said second and third circuits ineffective.

4. In an aircraft heating system, the combination of a plurality of groups of internal combustion type heating units having electrically energized igniters, a pump to supply a fuel mixture to said units, a power means connected to drive said pump, a plurality of relays each having a switch-controlled energizing circuit, means responsive to the failure of effective operation of said pump to open said relay energizing circuits, and separate circuits completed respectively by operation of said relays to supply energizing current to said igniters.

5. In an aircraft heating system, the combination of a plurality of groups of internal combustion type heating units having electrically energized igniters, a pump to supply a fuel mixture to said units, power means connected to drive said pump, a plurality of manually operable primary switches each having a holding circuit completed by closure thereof, means controlled by completion of the holding circuit of either of said switches to render said power means operative, a plurality of secondary switches closed in response to effective operation of said pump and opened in response to failure of said pump to operate effectively, and a plurality of circuits for respectively energizing said groups of igniters, each of said last-named circuits including one of said primary and one of said secondary switches.

6. In an aircraft heating system, a plurality of groups of internal combustion type heating units having electrically energized igniters each drawing a substantial current, a pump to supply a fuel mixture to said units, an internal combustion engine connected to drive said pump and having an electrical ignition system, a manually completed first circuit for rendering said ignition system effective, a second circuit for energizing the igniters of one of said groups of heating units and a third circuit for energizing the igniters of another of said groups of heating units, and a switch responsive to failure of operation of said pump to render said second and third circuits ineffective.

7. In an aircraft heating system, the combination of a plurality of groups of internal combustion type heating units, each having an electrically energized igniter, a temperature responsive switch associated with each of said heating units to deenergize the igniter as said heating unit attains its normal operating temperature, a pump for supplying a fuel mixture to said units, power means connected to drive said pump, a plurality of manually operable primary switches, each having a holding circuit completed upon closure thereof, means controlled by the completion of the holding circuit of either of said primary switches to render said power means effective for operation, a plurality of secondary switches closed in response to effective operation of said pump and opened in response to failure of said pump to operate effectively, and a plurality of groups of parallel circuits for respectively energizing the igniters of the groups of heating units, each of said last named circuits including one of said primary switches, one of said secondary switches, and one of the temperature responsive switches.

8. The combination set forth in claim 7 in which means are provided for manually preventing operation of said means which renders the power means operative.

SEYMOUR E. HEYMANN.